United States Patent
Wang

(10) Patent No.: US 9,704,015 B2
(45) Date of Patent: Jul. 11, 2017

(54) FINGERPRINT IMAGE PROCESSING METHOD AND DEVICE

(71) Applicant: HIMAX TECHNOLOGIES LIMITED, Tainan (TW)

(72) Inventor: Tzung-Ren Wang, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 58 days.

(21) Appl. No.: 14/931,864

(22) Filed: Nov. 4, 2015

(65) Prior Publication Data

US 2017/0124380 A1    May 4, 2017

(51) Int. Cl.
*G06K 9/00* (2006.01)

(52) U.S. Cl.
CPC ..... *G06K 9/00073* (2013.01); *G06K 9/00093* (2013.01)

(58) Field of Classification Search
CPC ................. G06K 9/00073; G06K 9/00093
USPC ........................................................ 382/125
See application file for complete search history.

(56) References Cited

U.S. PATENT DOCUMENTS 5,509,083 A * 4/1996 Abtahi ............... G06K 7/10831
                                                               235/380
2010/0232659 A1   9/2010 Rahmes et al.

FOREIGN PATENT DOCUMENTS

| CN | 102831403 | | 12/2012 |
| CN | 104615992 | | 5/2015 |
| CN | 102831403 B | * | 9/2015 |
| JP | 2000020693 A | * | 1/2000 |
| TW | 200535712 | | 11/2005 |
| TW | 201533601 | | 9/2015 |

OTHER PUBLICATIONS

"Office Action of Taiwan Counterpart Application", issued on May 24, 2016, p. 1-p. 4.

* cited by examiner

*Primary Examiner* — Amandeep Saini
(74) *Attorney, Agent, or Firm* — Jianq Chyun IP Office

(57) ABSTRACT

Fingerprint image processing method and device are provided, and the fingerprint image processing method includes following steps. A plurality of first fingerprint features are extracted from a fingerprint image by a first search algorithm. An inverse process is performed on the fingerprint image to obtain an inverse fingerprint image. A plurality of reference features are extracted from the inverse fingerprint image by the first search algorithm. A plurality of second fingerprint features are obtained from the fingerprint image based on coordinates of the reference features.

10 Claims, 5 Drawing Sheets

FINGERPRINT IMAGE PROCESSING METHOD AND DEVICE

BACKGROUND OF THE INVENTION

Field of the Invention

The invention relates to a processing method and a processing device, and more particularly, to a fingerprint image processing method and a fingerprint image processing device.

Description of Related Art

In recent years, the fingerprint identification technology has been widely applied in various electronic devices to enhance anti-fake capability and security for the devices. In the fingerprint identification technology, whether a fingerprint feature is correct will influence precision for the entire device. Further, the conventional fingerprint image processing device often needs use different search algorithms in order to extract two different fingerprint features from the fingerprint image. Therefore, the conventional fingerprint image processing device often requires a longer operation time to extract a plurality of fingerprint features, such that an extraction speed for the fingerprint features is reduced accordingly to cause inconveniences in use of the fingerprint image processing device.

SUMMARY OF THE INVENTION

The invention is directed to a fingerprint image processing method and a fingerprint image processing device, which are capable of extracting two different fingerprint features by using the same search algorithm in order to increase the extraction speed for the fingerprint features while improving the convenience in use of the fingerprint image processing device.

A fingerprint image processing method of the invention includes the following steps. A plurality of first fingerprint features are extracted from a fingerprint image by a first search algorithm. An inverse process is performed on the fingerprint image to obtain an inverse fingerprint image. A plurality of reference features are extracted from the inverse fingerprint image by the first search algorithm. A plurality of second fingerprint features are obtained from the fingerprint image based on coordinates of the reference features.

A fingerprint image processing device of the invention includes a fingerprint sensor and a processor. The fingerprint sensor generates an original image. The processor converts the original image into a fingerprint image by a preceding procedure and extracts a plurality of first fingerprint features from the fingerprint image by a first search algorithm. Further, the processor performs an inverse process on the fingerprint image to obtain an inverse fingerprint image. Furthermore, the processor extracts a plurality of reference features from the inverse fingerprint image by the first search algorithm and obtains a plurality of second fingerprint features from the fingerprint image based on coordinates of the reference features.

Based on the above, the invention uses the first search algorithm to extract the first fingerprint features from the fingerprint image, and obtains the second fingerprint features from the fingerprint image by using the coordinates of the reference features extracted from the inverse fingerprint image. In other words, the invention is capable of using the same search algorithm to obtain the first fingerprint features and the second fingerprint features from the fingerprint image. As a result, the extraction speed of the fingerprint features can be increased while improving the convenience in use of the fingerprint image processing device.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
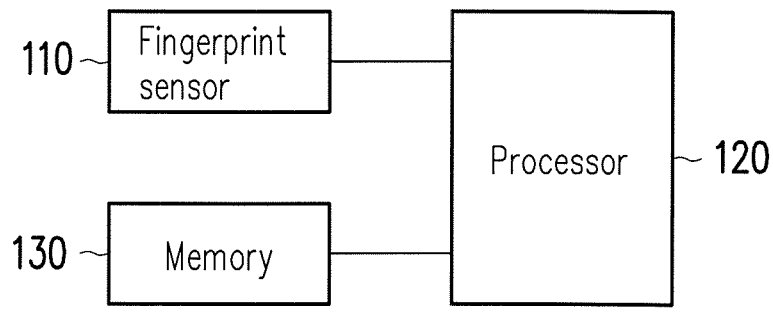
FIG. 1 is a schematic diagram of a fingerprint image processing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a fingerprint image processing device according to an embodiment of the invention. As shown in FIG. 1, a fingerprint image processing device 10 includes a fingerprint sensor 110, a processor 120 and a memory 130. The fingerprint sensor 110 can detect a fingerprint on the finger, and accordingly generate an original image composed of a plurality of pixels. Further, the fingerprint sensor 110 may be, for example, an optical sensor, a capacitive sensor or the like.

Figure 2:
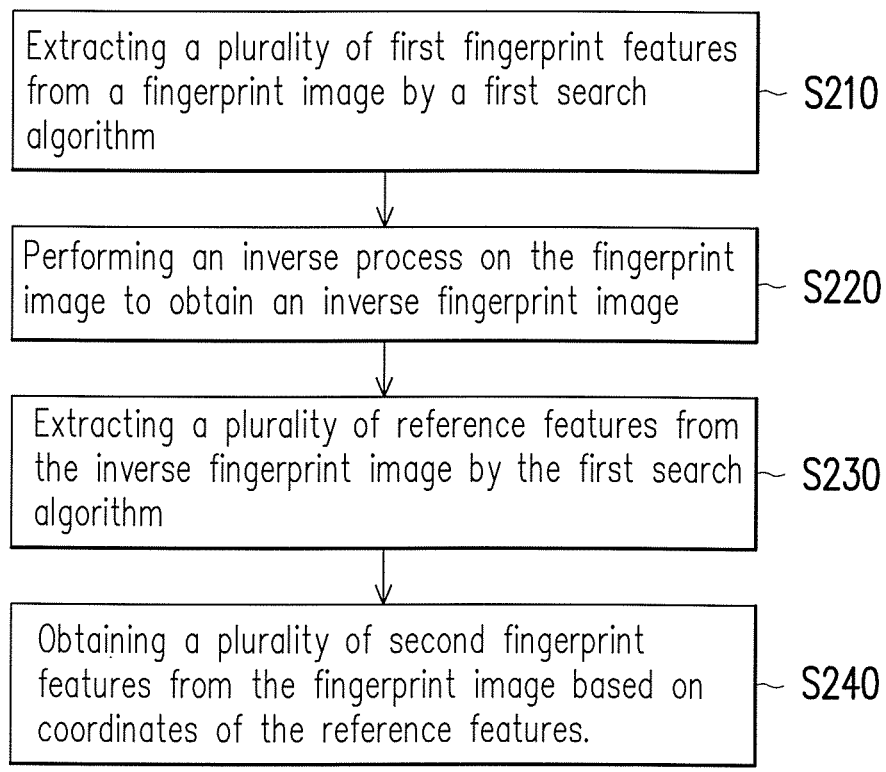
FIG. 2 is a flowchart of a fingerprint image processing method according to an embodiment of the invention.

FIG. 2 is a flowchart of a fingerprint image processing method according to an embodiment of the invention. Operations of the fingerprint image processing device 10 are described below with reference to both FIG. 1 and FIG. 2. The processor 120 can convert the original image generated by the fingerprint sensor 110 into a fingerprint image by a preceding procedure. Subsequently, as shown in step S210, the processor 120 extracts a plurality of first fingerprint features from the fingerprint image by a first search algorithm. The fingerprint image includes a plurality image blocks. The first search algorithm is used to analyze a gray level distribution of an image block, and the processor 120 determines whether the image block contains a first fingerprint feature based on a result of the first search algorithm. Further, as shown in step S220, the processor 120 performs an inverse process on the fingerprint image to obtain an inverse fingerprint image.

As shown in step S230, the processor 120 can extract a plurality of reference features from the inverse fingerprint image by the same first search algorithm. Subsequently, as shown in step S240, the processor 120 can obtain a plurality of second fingerprint features from the fingerprint image based on coordinates of the reference features. In other words, the processor 120 can use the same first search algorithm to obtain the different first fingerprint features and the second fingerprint features from the fingerprint image by the inverse process performed on the fingerprint image. As a result, a complexity of the operation for extracting the fingerprint features may be reduced, so that the extraction speed of the fingerprint features can be increased while improving the convenience in use of the fingerprint image processing device 10.

In terms of the application, the processor 120 can recognize or repair the fingerprint image by using the first fingerprint features and the second fingerprint features. For instance, in an embodiment, at least one predetermined fingerprint image is stored in the memory 130, and the at least one predetermined fingerprint image includes a plurality of predetermined features. The processor 120 can compare each of the first fingerprint features and the second fingerprint features individually with the predetermined features in the memory 130, so as to determine whether the fingerprint image matches the predetermined fingerprint image. Further, in another embodiment, the processor 120 can set the first fingerprint features and the second fingerprint features as the fingerprint features that need to be repaired, so as to delete or repair the first fingerprint features and the second fingerprint features in the fingerprint image.

Figure 3:
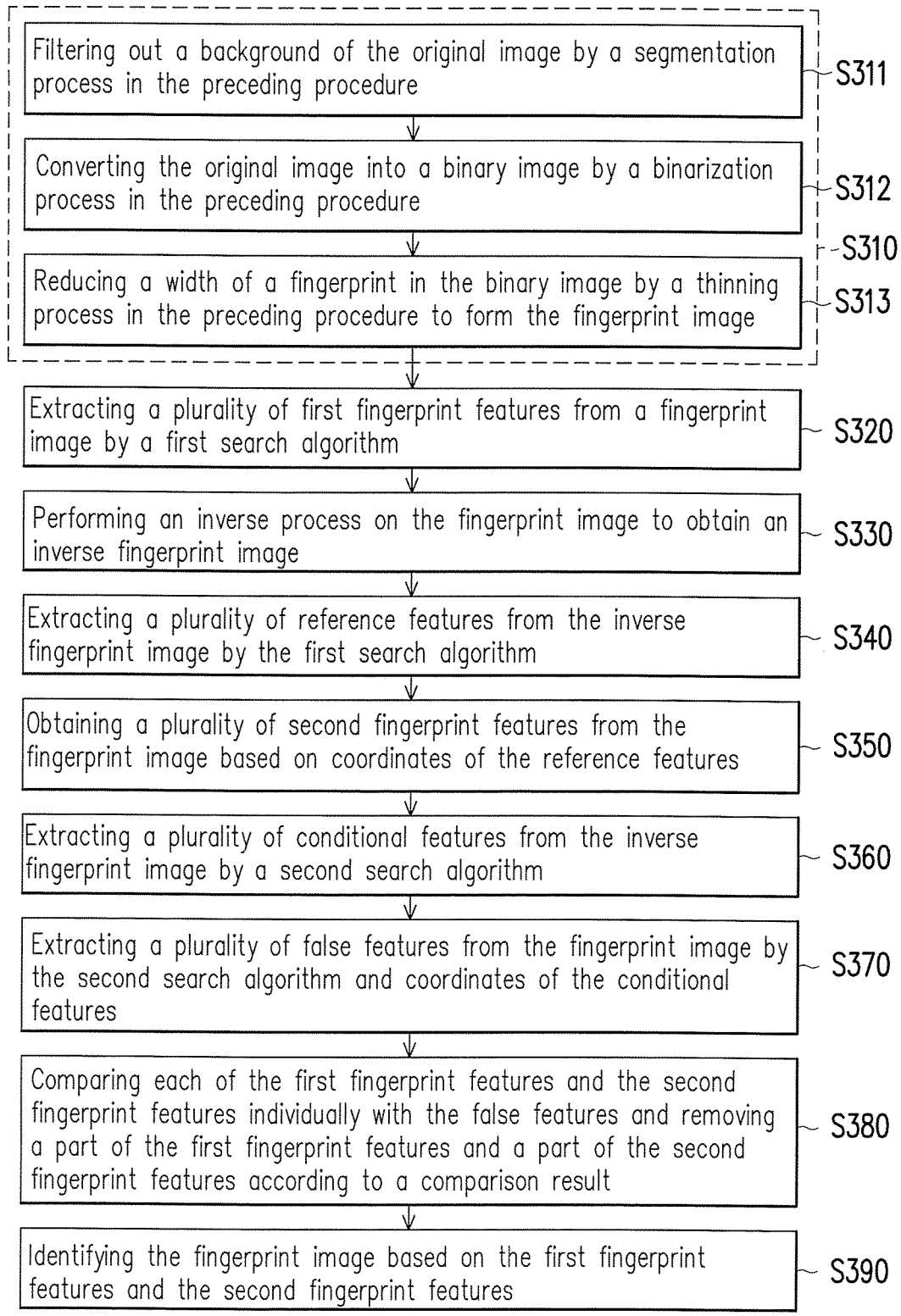
FIG. 3 is a flowchart of a fingerprint image processing method according to another embodiment of the invention.

FIG. 3 is a flowchart of a fingerprint image processing method according to another embodiment of the invention. The operation of identifying the fingerprint image by the first fingerprint features and the second fingerprint features is further described below with reference to FIG. 1 and FIG. 3.

As shown in step S310, the processor 120 can convert the original image generated by the fingerprint sensor 110 into the fingerprint image by a preceding procedure. The preceding procedure includes a segmentation process, a binarization process and a thinning process. Specifically, the original image can be divided into a foreground and a background, wherein a region where the fingerprint is located is the foreground, and a region outside the fingerprint is the background. As shown in step S311, the processor 120 filters out the background of the original image by the segmentation process in the preceding procedure.

Figure 4:
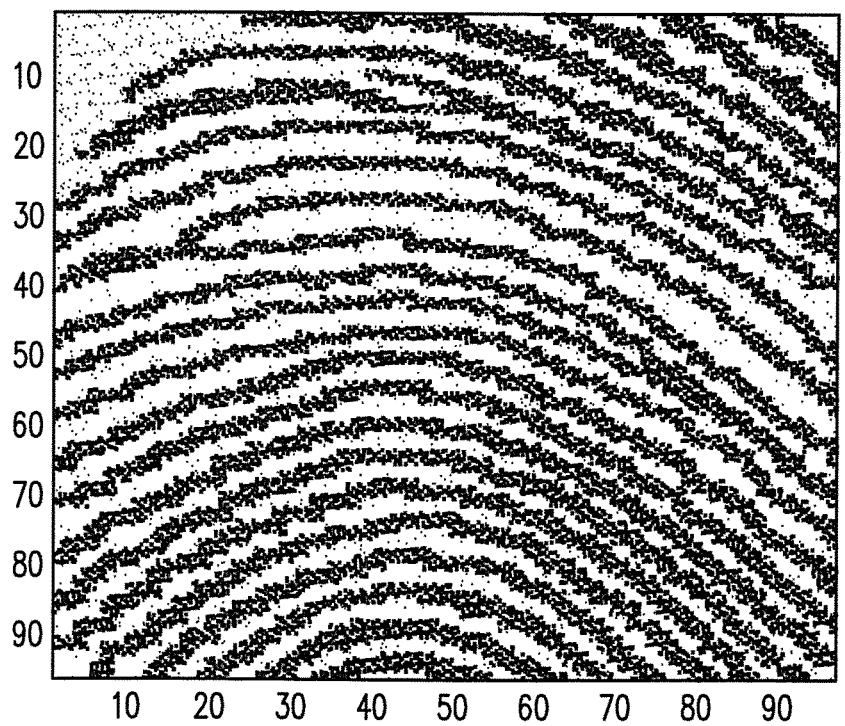
FIG. 4 and FIG. 5 are schematic diagrams respectively illustrating a portion of the original image according to an embodiment of the invention.
Figure 5:
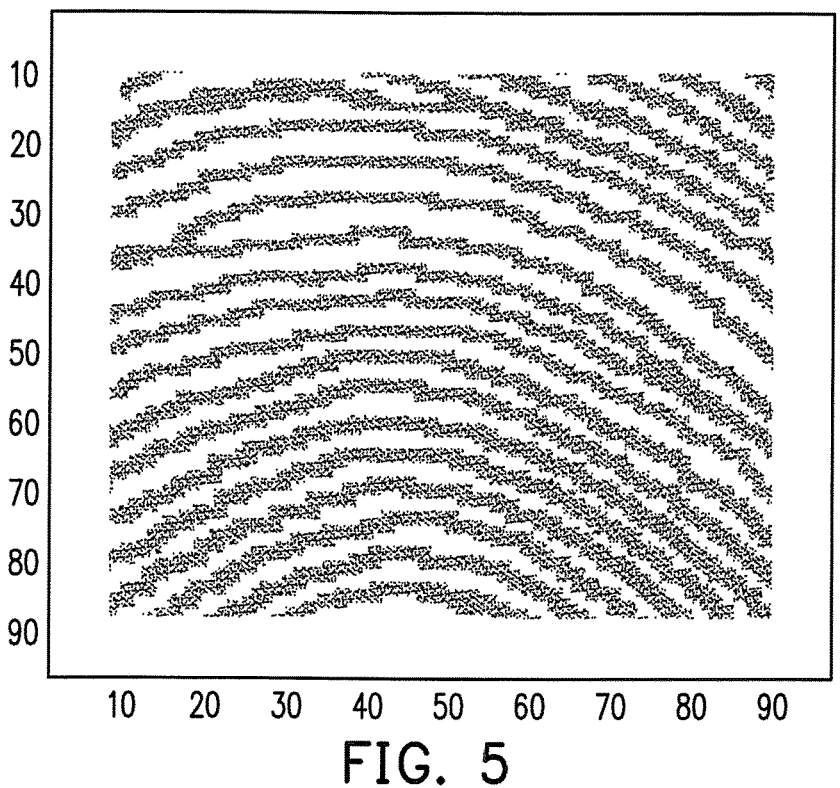

Furthermore, the processor 120 can divide the original image into a plurality image blocks and calculates an orientation field for each of the image blocks, so that a flow direction of the fingerprint can be estimated. In addition, the processor 120 can set a filter based on the orientation fields of the original image and enhance the original image by using the filter, so that the ridge lines on the fingerprint in the original image can be clearer. For instance, FIG. 4 and FIG. 5 are schematic diagrams respectively illustrating a portion of the original image according to an embodiment of the invention. FIG. 4 illustrates the original image generated by the fingerprint sensor 110, and FIG. 5 illustrates the original image that is enhanced by the processor 120.

Subsequently, the processor 120 can present the fingerprint in a manner of skeleton by the binarization process and the thinning process. Specifically, as shown in step S312, the processor 120 converts the original image into a binary image by the binarization process in the preceding procedure. The processor 120 compares a pixel value of each pixel in the original image with a threshold. Further, the processor 120 sets the pixel having the pixel value greater than the threshold to black and sets the pixel having th pixel value not greater than the threshold to white, so as to form the binary image.

Figure 6:
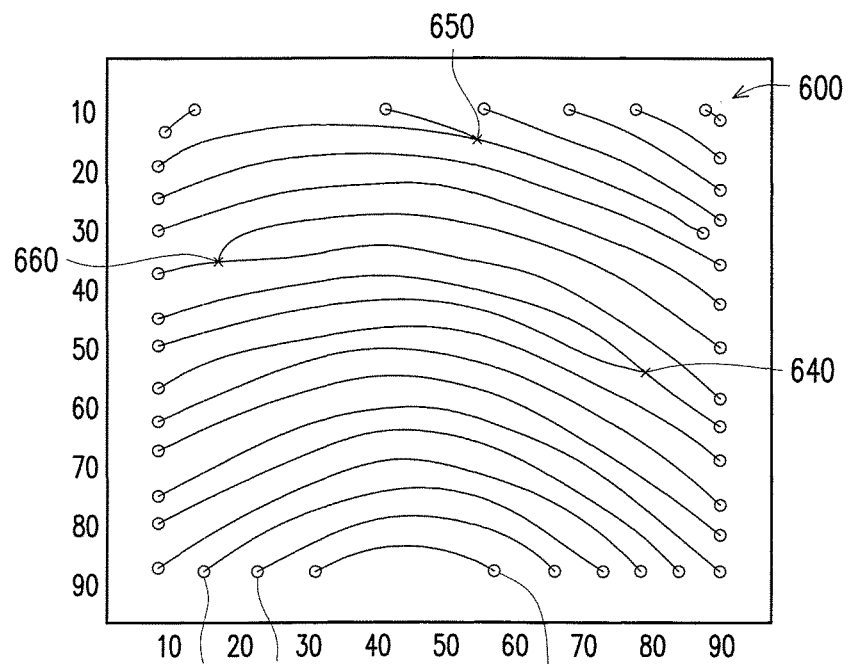
FIG. 6 is a schematic diagram illustrating a portion of the fingerprint image according to an embodiment of the invention.

Subsequently, as shown in step S313, the processor 120 can reduce a width of the fingerprint in the binary image by the thinning process and maintain integrity of the fingerprint. Specifically, the width of the fingerprint is reduced into a width of one pixel by the thinning process, so as to form the fingerprint image. For instance, FIG. 6 is a schematic diagram illustrating a portion of the fingerprint image according to an embodiment of the invention. As shown in FIG. 6, the original image can be converted into a fingerprint image 600 as depicted in FIG. 6 by the binarization process and the thinning process.

Figure 7:
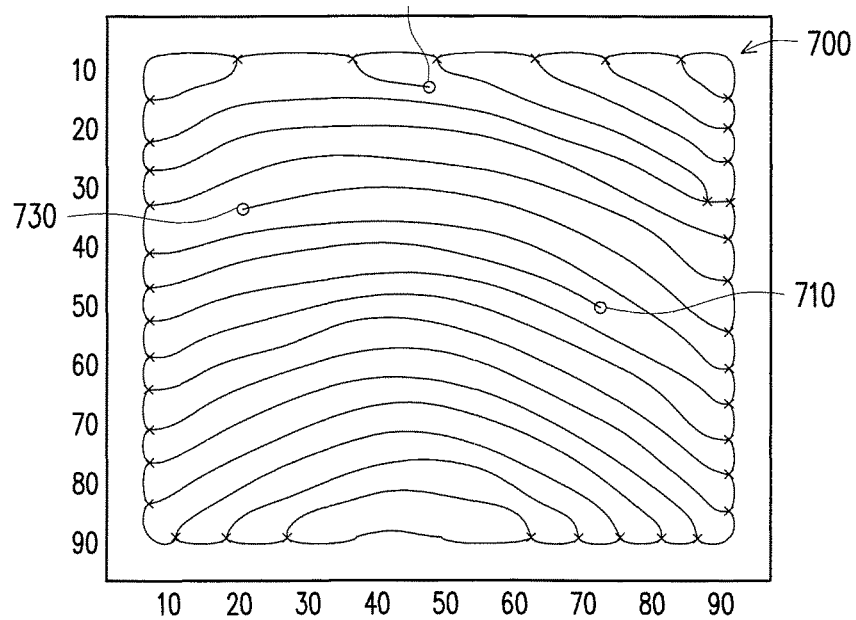
FIG. 7 is a schematic diagram illustrating a portion of the inverse fingerprint image according to an embodiment of the invention.
Figure 8D:
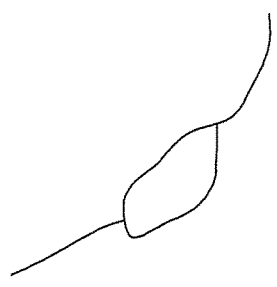
FIGS. 8($a$)~8($d$) are schematic diagrams illustrating false features according to an embodiment of the invention.
Figure 8C:
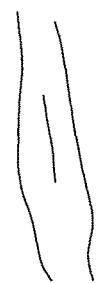
Figure 8B:
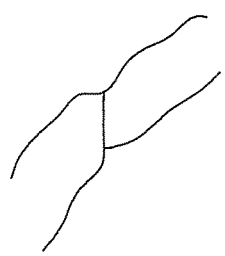
Figure 8A:
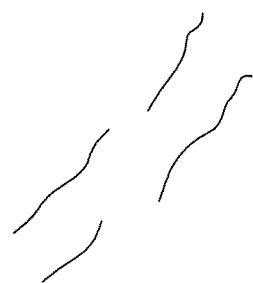

As shown in step S320, the processor 120 can extract a plurality of first fingerprint features from the fingerprint image by the first search algorithm, and the first fingerprint features may be, for example, a plurality of endings in the fingerprint image 600, such as endings 610 to 630. Further, as shown in step S330, the processor 120 can obtain an inverse fingerprint image by an inverse process. For instance, FIG. 7 is a schematic diagram illustrating a portion of the inverse fingerprint image according to an embodiment of the invention. As shown in FIG. 7, the processor 120 can perform the inverse process on the fingerprint image 600 in order to obtain an inverse fingerprint image 700 as depicted in FIG. 7. Subsequently, as shown in step S340, the processor 120 can extract a plurality of reference features from the inverse fingerprint image 700 by the same first search algorithm, and the reference features may be, for example, a plurality of endings in the inverse fingerprint image 700, such as endings 710 to 730.

It should be noted that, the common fingerprint features includes an ending and a bifurcation. In addition, a duality or an inverse relationship is present between the ending and the bifurcation. That is to say, an inversion of the ending is the bifurcation, and an inversion of the bifurcation is the ending. In other words, the ending becomes the bifurcation after the inverse process is performed. Therefore, in view of an image block located at the same coordinate position of the fingerprint image 600 and the inverse fingerprint image 700, the endings in the inverse fingerprint image 700 can correspond to the bifurcations of the fingerprint image 600. That is, the processor 120 can obtain corresponding bifurcations from the fingerprint image 600 based on coordinates of the endings in the inverse fingerprint image 700.

Therefore, in terms of operation, as shown in step S350, the processor 120 can obtain a plurality of second fingerprint features from the fingerprint image based on coordinates of the reference features, and the second fingerprint features may be, for example, the bifurcations in the fingerprint image. For instance, the processor 120 can obtain corresponding bifurcations 640 to 660 from the fingerprint image 600 based on coordinates of the endings 710 to 730 in the inverse fingerprint image 700. It is worth mentioning that, as comparison to a determination based on the endings, a determination based on the bifurcations has higher error rate. Therefore, by using the first search algorithm based on the endings to obtain the bifurcations in the fingerprint image, precision for extracting the fingerprint features may be improved accordingly.

In addition, as shown in step S390, the processor 120 can compare each of the first fingerprint features and the second fingerprint features individually with the predetermined features in the memory 130, so as to determine whether the fingerprint image matches the predetermined fingerprint image in the memory 130. It should be noted that, because it is possible that the first fingerprint features and the second fingerprint features obtained by the processor 120 are not really the fingerprint features, the processor 120 can further remove a part of the first fingerprint features and a part of the second fingerprint features by steps S360 to S380, so as further improve the precision for fingerprint identification.

To be specific, FIGS. 8(a)~8(d) are schematic diagrams illustrating the false features according to an embodiment of the invention. As shown in FIGS. 8(a)~8(d), the common false features include: a break ridge depicted in FIG. 8(a), a bridge depicted in FIG. 8(b), a short ridge depicted in FIG. 8(c) and a hole depicted in FIG. 8(d). Among them, a duality or an inverse relationship is present between the break ridge and the bridge depicted in FIG. 8(a) and FIG. 8(b), and a duality or an inverse relationship is also present between the short ridge and the hole depicted in FIG. 8(c) and FIG. 8(d). Therefore, with use of the inverse process performed on the fingerprint image, the processor 120 can obtain the break ridge and the bridge in the fingerprint image by a second search algorithm and also obtain the short ridge and the hole by another second search algorithm.

For instance, as shown in step S360, the processor 120 can extract a plurality of conditional features (e.g., the break ridge) from the inverse fingerprint image by a second search algorithm before identifying the fingerprint image. The inverse fingerprint image includes a plurality image blocks. The second search algorithm is used to analyze a gray level distribution of an image block, and the processor 120 determines whether the image block contains a conditional feature (e.g., the break ridge) based on a result of the second search algorithm. Subsequently, as shown in step S370, the processor 120 can extract a plurality of false features (e.g., the break ridge) from the fingerprint image by the same second search algorithm and obtain other false features (e.g., the bridge) from the fingerprint image based on coordinates of the conditional features. Further, as shown in step S380, the processor 120 can compare each of the first fingerprint features and the second fingerprint features individually with the false features, so as to identify the false features among the first fingerprint features and the second fingerprint features. Subsequently, the processor 120 can remove a part of the first fingerprint features and a part of the second fingerprint features according to a comparison result, so as to further improve the precision for fingerprint identification.

In summary, the invention performs the inverse process on the fingerprint image to obtain the inverse fingerprint image. Further, the invention extracts corresponding fingerprint features from the fingerprint image by using the coordinates of the reference features extracted from the inverse fingerprint image. Accordingly, the invention is capable of obtaining two different fingerprint features from the fingerprint image by using the same search algorithm. As a result, a complexity of the operation for extracting the fingerprint features may be reduced, so that the extraction speed of the fingerprint features can be increased while improving the convenience in use of the fingerprint image processing device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint image processing method, comprising:
   extracting a plurality of first fingerprint features from a fingerprint image by a first search algorithm;
   performing an inverse process on the fingerprint image to obtain an inverse fingerprint image;
   extracting a plurality of reference features from the inverse fingerprint image by the first search algorithm; and
   obtaining a plurality of second fingerprint features from the fingerprint image based on coordinates of the reference features.

2. The fingerprint image processing method of claim 1, wherein the first fingerprint features are a plurality of endings in the fingerprint image, the second fingerprint features are a plurality of bifurcations in the fingerprint image, and the fingerprint image processing method further comprises:
   identifying the fingerprint image based on the first fingerprint features and the second fingerprint features.

3. The fingerprint image processing method of claim 2, further comprising:
   extracting a plurality of conditional features from the inverse fingerprint image by a second search algorithm before identifying the fingerprint image;
   extracting a plurality of false features from the fingerprint image by the second search algorithm and coordinates of the conditional features; and
   comparing each of the first fingerprint features and the second fingerprint features individually with the false features and removing a part of the first fingerprint features and a part of the second fingerprint features according to a comparison result.

4. The fingerprint image processing method of claim 3, further comprising:
   perform ling a preceding procedure on an original image to convert the original image into the fingerprint image.

5. The fingerprint image processing method of claim 4, wherein the step of performing the preceding procedure on the original image comprises:
   filtering out a background of the original image by a segmentation process in the preceding procedure.

6. The fingerprint image processing method of claim 5, wherein the step of performing the preceding procedure on the original image further comprises:
   converting the original image into a binary image by a binarization process in the preceding procedure; and
   reducing a width of a fingerprint in the binary image by a thinning process in the preceding procedure to form the fingerprint image.

7. A fingerprint image processing device, comprising:
   a fingerprint sensor, generating an original image; and
   a processor, converting the original image into a fingerprint image by a preceding procedure and extracting a plurality of first fingerprint features from the fingerprint image by a first search algorithm, wherein the processor performs an inverse process on the fingerprint image to obtain an inverse fingerprint image, and the processor extracts a plurality of reference features from the inverse fingerprint image by the first search algorithm and obtains a plurality of second fingerprint features from the fingerprint image based on coordinates of the reference features.

8. The fingerprint image processing device of claim 7, wherein the first fingerprint features are a plurality of endings in the fingerprint image, the second fingerprint features are a plurality of bifurcations in the fingerprint image, and the processor identifies the fingerprint image based on the first fingerprint features and the second fingerprint features.

9. The fingerprint image processing device of claim 8, wherein the processor extracts a plurality of conditional features from the inverse fingerprint image by a second search algorithm before identifying the fingerprint image, the processor further extracts a plurality of false features from the fingerprint image by the second search algorithm and coordinates of the conditional features, and the processor compares each of the first fingerprint features and the second fingerprint features individually with the false features and removes a part of the first fingerprint features and a part of the second fingerprint features according to a comparison result.

10. The fingerprint image processing device of claim 7, wherein the processor filters out a background of the original image by a segmentation process in the preceding procedure, the processor converts the original image into a binary image by a binarization process in the preceding procedure, and the processor reduces a width of a fingerprint in the binary image by a thinning process in the preceding procedure to form the fingerprint image.

\* \* \* \* \*